(12) United States Patent
Min et al.

(10) Patent No.: US 12,444,793 B2
(45) Date of Patent: Oct. 14, 2025

(54) SECONDARY BATTERY AND SECONDARY BATTERY CASE

(71) Applicant: LG Energy Solution, Ltd., Seoul (KR)

(72) Inventors: Min Kyu Min, Daejeon (KR); Hyun Beom Kim, Daejeon (KR); Dae Wook Kim, Daejeon (KR); Sung Yun Kwak, Daejeon (KR); Jeong Min Ha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 586 days.

(21) Appl. No.: 17/767,548

(22) PCT Filed: Dec. 17, 2020

(86) PCT No.: PCT/KR2020/018573
§ 371 (c)(1),
(2) Date: Apr. 8, 2022

(87) PCT Pub. No.: WO2021/125842
PCT Pub. Date: Jun. 24, 2021

(65) Prior Publication Data
US 2023/0216113 A1  Jul. 6, 2023

(30) Foreign Application Priority Data

Dec. 17, 2019 (KR) .................. 10-2019-0169262
Dec. 16, 2020 (KR) .................. 10-2020-0176713

(51) Int. Cl.
*H01M 50/136* (2021.01)
*H01M 50/105* (2021.01)

(52) U.S. Cl.
CPC ....... *H01M 50/136* (2021.01); *H01M 50/105* (2021.01)

(58) Field of Classification Search
CPC .................................................. H01M 50/136
See application file for complete search history.

(56) References Cited

U.S. PATENT DOCUMENTS

2016/0093837 A1  3/2016  Bushnell et al.
2016/0380245 A1  12/2016  Kang
(Continued)

FOREIGN PATENT DOCUMENTS

CN  106384839 A  2/2017
CN  107851741 A  3/2018
(Continued)

OTHER PUBLICATIONS

Extended European Search Report including Written Opinion for Application No. 20902733.3 dated Mar. 31, 2023, pp. 1-8.
(Continued)

*Primary Examiner* — Brian R Ohara
*Assistant Examiner* — M. T. Leonard
(74) *Attorney, Agent, or Firm* — Lerner David LLP

(57) ABSTRACT

Disclosed are a secondary battery and a secondary battery case.
According to one aspect of the present invention, provided is a case for a secondary battery including: a first recess part having a recessed shape; a second recess part opposite the first recess part and having a recessed shape; a circumferential part configured to surround a circumference of each of the first recess part and the second recess part when the case is unfolded; and a connection part provided between the first recess part and the second recess part to connect the first recess part to the second recess part, wherein, when the case is unfolded, the connection part includes: a first connection surface inclined in a first direction from one end of the first recess part; and a second connection surface inclined in the first direction from one end of the second recess part.

17 Claims, 8 Drawing Sheets

(56) References Cited

U.S. PATENT DOCUMENTS

| | | | |
|---|---|---|---|
| 2017/0133707 A1* | 5/2017 | Han | H01M 50/557 |
| 2018/0219245 A1 | 8/2018 | Choi et al. | |
| 2019/0027714 A1 | 1/2019 | Jung et al. | |
| 2019/0044099 A1 | 2/2019 | Kang | |
| 2019/0229301 A1 | 7/2019 | Li et al. | |
| 2019/0237832 A1 | 8/2019 | Ju et al. | |
| 2019/0305260 A1 | 10/2019 | Kim et al. | |
| 2019/0305261 A1 | 10/2019 | Kim et al. | |
| 2019/0386330 A1 | 12/2019 | Choi et al. | |
| 2020/0168852 A1 | 5/2020 | Oh et al. | |
| 2020/0280044 A1 | 9/2020 | Park et al. | |
| 2020/0303694 A1* | 9/2020 | Koh | H01M 50/209 |
| 2020/0365836 A1 | 11/2020 | Jung et al. | |
| 2020/0403191 A1 | 12/2020 | Kang | |
| 2021/0066676 A1 | 3/2021 | Jung et al. | |
| 2021/0283671 A1 | 9/2021 | Kotik et al. | |
| 2021/0288360 A1 | 9/2021 | Kim et al. | |
| 2021/0344067 A1 | 11/2021 | Kang | |
| 2022/0102790 A1 | 3/2022 | Jung et al. | |
| 2022/0109218 A1 | 4/2022 | Park et al. | |
| 2022/0115687 A1 | 4/2022 | Choi et al. | |
| 2022/0158272 A1 | 5/2022 | Ju et al. | |
| 2022/0158276 A1 | 5/2022 | Kim et al. | |

FOREIGN PATENT DOCUMENTS

| | | | |
|---|---|---|---|
| CN | 110024161 A | 7/2019 | |
| CN | 110062964 A | 7/2019 | |
| CN | 110114898 A | 8/2019 | |
| EP | 3321991 A1 | 5/2018 | |
| EP | 3561898 A1 | 10/2019 | |
| EP | 3699974 A1 | 8/2020 | |
| JP | 2004071301 A | 3/2004 | |
| JP | 2019186199 A | 10/2019 | |
| KR | 20160077871 A | 7/2016 | |
| KR | 20170002013 A | 1/2017 | |
| KR | 20170058021 A | 5/2017 | |
| KR | 101779156 B1 | 9/2017 | |
| KR | 20180029856 A | 3/2018 | |
| KR | 101927262 B1 | 12/2018 | |
| KR | 20190010434 A | 1/2019 | |
| KR | 20190032609 A | 3/2019 | |
| KR | 20190090153 A | 8/2019 | |
| KR | 20190093045 A | 8/2019 | |
| KR | 20190106473 A | 9/2019 | |
| WO | WO-2017179865 A1 * | 10/2017 | H01M 10/0436 |
| WO | 2018104051 A1 | 6/2018 | |
| WO | 2019017637 A1 | 1/2019 | |

OTHER PUBLICATIONS

International Search Report for PCT/KR2020/018573 dated Mar. 25, 2021. 3 pgs.

* cited by examiner

PRIOR ART

SECONDARY BATTERY AND SECONDARY BATTERY CASE

CROSS-REFERENCE TO RELATED APPLICATIONS

The present application is a national phase entry under 35 U.S.C. § 371 of International Application No. PCT/KR2020/018573 filed on Dec. 17, 2020 which claims the benefit of the priority of Korean Patent Application Nos. 10-2019-0169262, filed on Dec. 17, 2019, and 10-2020-0176713, filed on Dec. 16, 2020, which are hereby incorporated by reference in their entirety.

TECHNICAL FIELD

The present invention relates to a secondary battery, and more particularly, to a case for a secondary battery, which has a structure capable of reducing a volume occupied by the secondary battery when compared to the related art.

BACKGROUND ART

Secondary batteries that are repetitively chargeable and dischargeable may be divided into cylindrical type secondary batteries, prismatic type secondary batteries, and pouch type secondary batteries according to their manufacturing methods or structures. Among them, in general, such a pouch type secondary battery has a structure including an electrode assembly in which electrodes and separators are alternately disposed in a sheet-shaped pouch exterior.

According to the related art, in order to manufacture the pouch type secondary battery, a forming process, in which a portion of an area of a pouch having a sheet shape is pressed by an area corresponding to an area of the electrode assembly to form a cup having a recessed shape, is performed, and then, the electrode assembly is mounted in the cup formed in the pouch. Thereafter, portions of the area of the pouch are attached to each other to form a sealing part.

The sealing part formed by attaching the portions of the area of the pouch to each other is formed by attaching areas that are not pressed in the forming process. Thus, a portion of an area of the sealing part may be deviated from a width of the cup due to a stepped portion between the sealing part, on which the forming process is not performed, and the cup, on which the forming process is performed. FIG. 1 illustrates a state in which a portion of an area of a sealing part 3, which is provided in each of upper and lower portions of a pouch 2 of a pouch-type secondary battery 1, which is manufactured according to the related art. The sealing part 3 is deviated by a width P from a width of a cup in which the electrode assembly is accommodated.

The protruding area as described above is generally referred to as a bat-ear. The bat-ear may act as a cause of an increase in dead space that is not contributed in capacity of the secondary battery, resulting in causing a problem that energy density of the secondary battery is reduced.

DISCLOSURE OF THE INVENTION

Technical Problem

Therefore, an object achieved by the present invention is to remove a dead space that occurs in a sealing part of a pouch type secondary battery manufactured according to a related art to increase in energy density of a secondary battery.

Technical Solution

According to a first aspect of the present invention for achieving the above object, provided is a case for a secondary battery, in which an electrode assembly having a structure, in which electrodes and separators are alternately disposed, is accommodated, the case including: a first recess part having a recessed shape; a second recess part opposite the first recess part and having a recessed shape; a circumferential part configured to surround a circumference of each of the first recess part and the second recess part when the case is unfolded; and a connection part provided between the first recess part and the second recess part to connect the first recess part to the second recess part, wherein, when the case is unfolded, the connection part includes: a first connection surface inclined upward from one end of the first recess part; and a second connection surface inclined upward from one end of the second recess part.

An upper end of the first connection surface and an upper end of the second connection surface may be connected to each other at an upper end of the connection part.

The circumferential part may include: a first circumferential part disposed on a circumference of the first recess part; and a second circumferential part disposed on a circumference of the second recess part.

When the case is unfolded, the first recess part and the second recess part may have shapes that are symmetrical to each other with respect to the connection part.

When the case is unfolded, the case may be bent in a V shape on an area on which the first circumferential part and the second circumferential part meet each other so that a recessed space A1 defined by the first recess part and a recessed space A2 defined by the second recess part face each other.

When the case is unfolded, the first connection surface may extend from a bottom surface of the first recess part and be inclined upward, and the second connection surface may extend from a bottom surface of the second recess part and be inclined upward.

When the case is unfolded, each of an area on which the first recess part and the connection part are connected to each other and an area on which the second recess part and the connection part are connected to each other may be provided as a curved surface.

When the case is unfolded, an area on which the first connection surface and the second connection surface are connected to each other may be formed as a curved surface.

An angle between the first circumferential part and the second circumferential part may have a value between approximately 80 degrees and approximately 160 degrees.

When the case is unfolded, an area on which the first connection surface and the second connection surface are connected to each other may be formed as a curved surface, and the surfaces may have a curvature radius (R1) of a curved area on which the first recess part and the first connection surface are connected to each other and a curvature radius (R2) of a curved area on which the second recess part and the second connection surface are connected to each other, which may be greater than each of a curvature radius (R3) of a curved area on which the first circumferential part and the second circumferential part are connected to each other and a curvature radius (R4) of a curved area on which the first connection surface and the second connection surface are connected to each other.

An angle α defined by an inner surface disposed at an opposite side of the connection part among inner surfaces of the first recess part and the first circumferential part, which meet each other, may be an obtuse angle.

According to a second aspect of the prevent invention for achieving the above object, provided is a case for a secondary battery, in which an electrode assembly having a structure in which electrodes and separators are alternately disposed, is accommodated, the case including: a first recess part having a recessed shape; a second recess part provided at one side of the first recess part and having a recessed shape; and a connection part provided between the first recess part and the second recess part to connect the first recess part to the second recess part, wherein, when the case is unfolded, the connection part includes: a first connection surface inclined upward from one end of the first recess part; and a second connection surface inclined upward from one end of the second recess part, wherein, when the case is unfolded, the case is bent in a V shape on an area on which the first circumferential part and the second circumferential part meet each other so that a recessed space (A1) defined by the first recess part and a recessed space (A2) defined by the second recess part face each other.

According to a third aspect of the prevent invention for achieving the above object, provided is a secondary battery including: an electrode assembly having a structure in which electrodes and separators are alternately disposed; and a case for the secondary battery.

Advantageous Effects

According to the present invention, the bat-ear occurring in the case for the secondary battery manufactured according to the related art may be minimized or removed. Therefore, the dead space occurring in the sealing part of the pouch type secondary battery manufactured according to the related art may be removed to increase the energy density of the secondary battery.

MODE FOR CARRYING OUT THE INVENTION

Hereinafter, structures of a case for a secondary battery and the secondary battery according to the present invention will be described with reference to the accompanying drawings.

Figure 1:
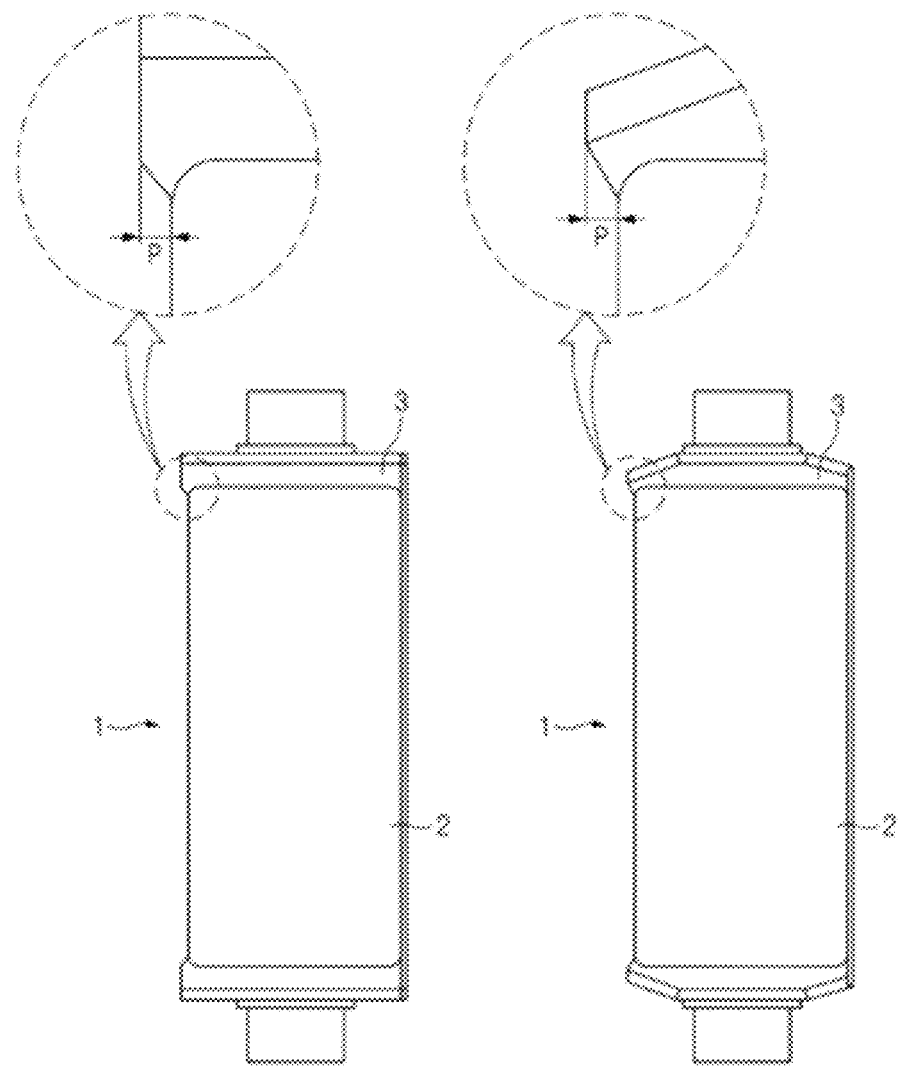
FIG. 1 is a view illustrating a structure of a secondary battery manufactured according to a related art.
Figure 2:
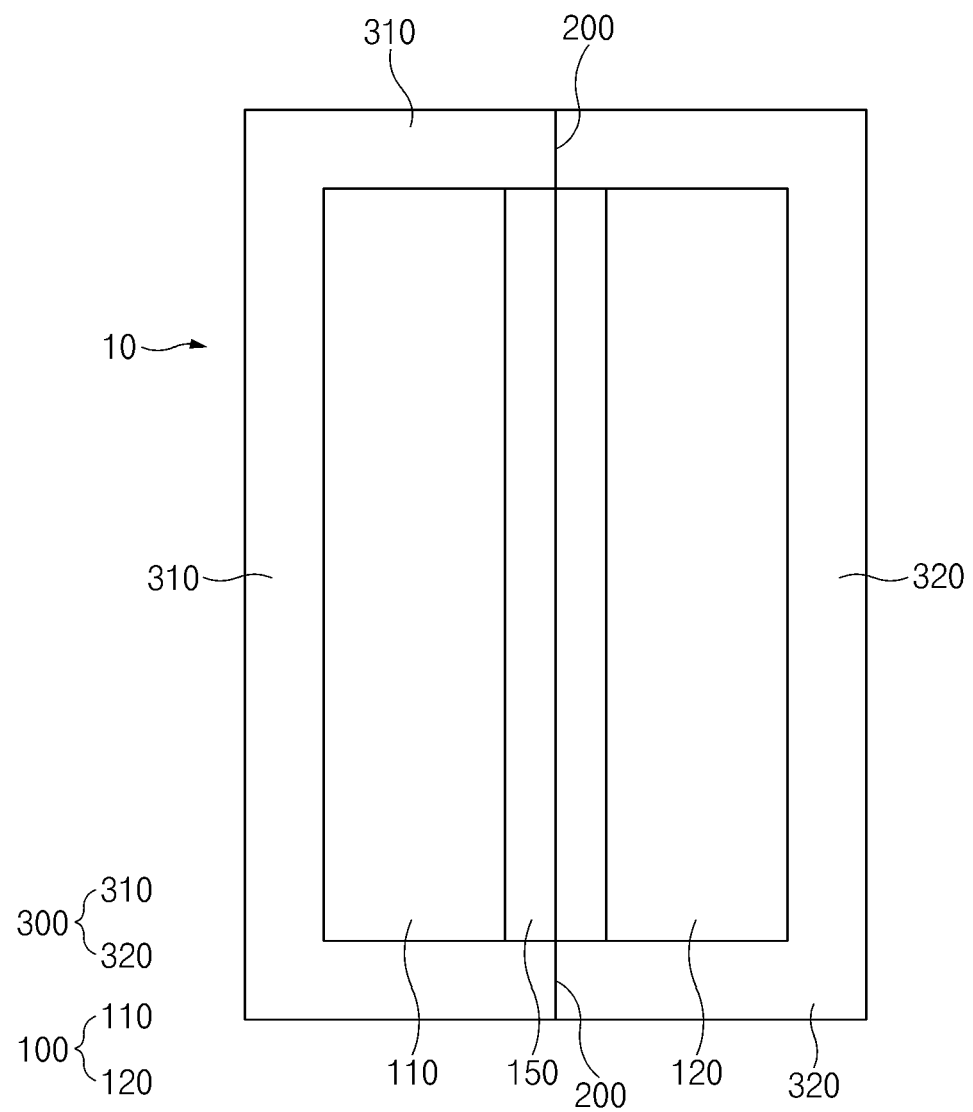
FIG. 2 is a plan view illustrating a state in which a case for a secondary battery is unfolded according to an embodiment of the present invention.
Figure 3:
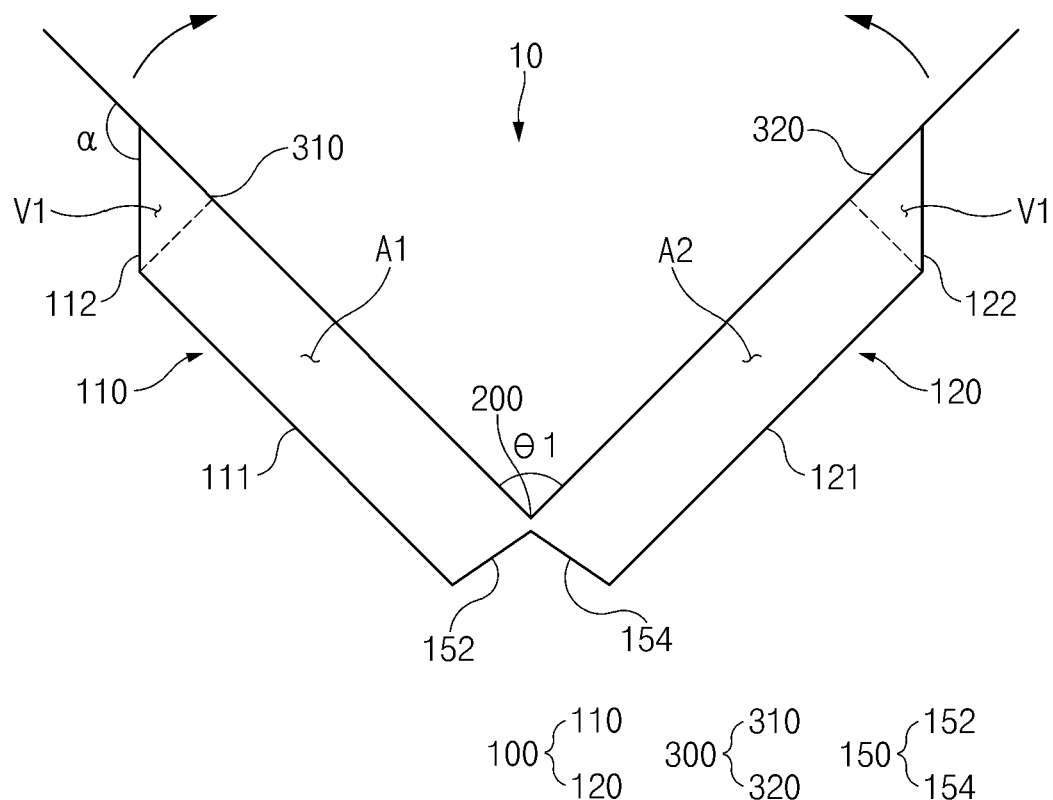
FIG. 3 is a vertical cross-sectional view illustrating the state in which the case for the secondary battery is unfolded according to an embodiment of the present invention.

FIG. 2 is a plan view illustrating a state in which a case for a secondary battery is unfolded according to an embodiment of the present invention, and FIG. 3 is a vertical cross-sectional view illustrating the state in which the case for the secondary battery is deployed according to an embodiment of the present invention.

In the present specification, "the state when the case is unfolded" may mean a state of the case when the case is unfolded by releasing predetermined bonding existing in the case, but is left without applying artificial force to the case.

Referring to FIGS. 2 and 3, a case 10 for a secondary battery (hereinafter, referred to as a 'case') according to the present invention may be configured to accommodate an electrode assembly having a structure in which electrodes and separators are alternately disposed.

Here, as illustrated in FIGS. 2 and 3, the case 10 may include a recess part 100 having a recessed shape. The recess part 100 may be provided in a pair, in which each of the pair of recessed parts are spaced apart from each other. In more detail, the recess part 100 may include a first recess part 110 and a second recess part 120 opposite the first recess part 110.

As described above, the recess part 100 has a recessed shape. Therefore, an internal space by the recess part may be defined in the recess part 100. That is, as illustrated in FIGS. 2 and 3, the case 10 may have a recessed space A1 defined by the first recess part 110 and a recessed space A2 defined by the second recess part 120.

Also, the case 10 according to the present invention may further include a circumferential part 300 surrounding circumferences of the first recess part 110 and the second recess part 120 when the case 10 is unfolded.

In this case, the circumferential part 300 may include a first circumferential part 310 disposed around the first recess part 110 and a second circumferential part 320 disposed around the second recess part 120. As illustrated in FIGS. 2 and 3, the first circumferential part 310 and the second circumferential part 320 may be in contact with each other. That is, when the case 10 is unfolded, the first circumferential part 310 and the second circumferential part 320 may be connected to each other.

Also, the case 10 according to the present invention may further include a connection part 150 connecting the first recess part 110 to the second recess part 120. As illustrated in FIGS. 2 and 3, the connection part 150 may be provided between the first recess part 110 and the second recess part 120. As illustrated in FIG. 3, the connection part 150 may be opened with respect to the first recess part 110 and the second recess part 120. Thus, the recessed space A1 of the first recess part 110 and the recessed space A2 of the second recess part 120 may communicate with each other by the connection part 150.

Here, as illustrated in FIG. 3, when the case 10 is unfolded, the connection part 150 may include a first connection surface 152 formed to be inclined upward from one end of the first recess part 110 and a second connection surface 154 formed to be inclined upward from one end of the second recess part 120. In more detail, the first connection surface 152 may be formed to be inclined upward from one end of a bottom surface 111 of the first recess part 110, and the second connection surface 154 may be formed to be inclined upward from one end of a bottom surface 121 of the second recess part 120.

As illustrated in FIG. 3, an upper end of the first connection surface 152 and an upper end of the second connection surface 154 may be connected to each other at an upper end of the connection part 150.

In more detail, a recess space A1 of the first recess part 110 may be defined by the bottom surface 111 of the first recess part 110, circumferential surfaces 112 and 113 (see FIG. 5) of the first recess part 110, and the first connection surface 152. Also, a recess space A2 of the second recess part 120 may be defined as the bottom surface 121 of the second recess part 120, circumferential surfaces 122 and 123 (see FIG. 5) of the second recess part 120, and the second connection surface 154.

The circumferential surfaces 112 and 113 of the first recess part 110 may include one surface 112 disposed at an opposite side of the first connection surface 152 and a pair of side surfaces 113 (see FIG. 5) connecting the one surface 112 to the first connection surface 152.

The circumferential surfaces 122 and 123 of the second recess part 120 may include one surface 122 disposed at an opposite side of the second connection surface 154 and a pair of side surfaces 123 (see FIG. 5) connecting the one surface 122 to the second connection surface 154.

When the case 10 is unfolded, the first connection surface 152 may extend from a bottom surface of the first recess part 110 and be inclined upward, and the second connection surface 154 may extend from a bottom surface of the second recess part 120 and be inclined upward. That is, the pair of connection surfaces 152 and 154, included in the connection part 150, may be formed to be inclined in a direction in which the pair of connection surfaces 152 and 154 are close to each other as it goes upward.

Thus, according to the present invention, the vertical cross-section of the first recess part 110 and the second recess part 120 may have an approximately L shape as illustrated in FIG. 3.

According to the present invention, when the case 10 is unfolded, the case 10 may be bent in a V shape on an area on which the first circumferential part 310 and the second circumferential part 320 meet each other. In FIG. 3, the V-shaped bent part 200 is illustrated on the area on which the first circumference 310 and the second circumferential part 320 meet each other. Thus, as illustrated in FIG. 3, when the case 10 is unfolded, the recessed space A1 defined by the first recess part 110 and the recessed space A2 defined by the second recess part 120 may face each other.

According to the related art, in order to manufacture a pouch type secondary battery, a process of folding a sheet-type exterior after pressing a portion of an area of the sheet-type exterior having a flat shape to form a recess part in the sheet-type exterior is performed.

However, according to the related art, before being folded, since the sheet-type exterior has the flat shape except for the area in which the recess part is defined, it is necessary to fold the sheet-type exterior at 180 degrees with respect to the area that is folded. However, in this case, since the folding angle of the sheet-type exterior is large, deformation in shape of the sheet-type exterior may increase before and after the folding process. Thus, a dead space that is not contributed to improve capacity in the secondary battery may be generated to cause a problem in which an outer appearance of the sheet-type exterior is largely deformed.

However, according to the present invention, since the area on which the sheet-type exterior (i.e., the case) is folded has the V-shape, the folding angle of the sheet-type exterior decreases in the folding process according to the related art. Thus, the deformation in shape of the sheet-type exterior before and after the folding process may be minimized. Thus, the dead space that is not distributed to improve the capacity in the secondary battery may be reduced to minimize the deformation in outer appearance, which occurs in the sheet-type exterior.

Figure 4:
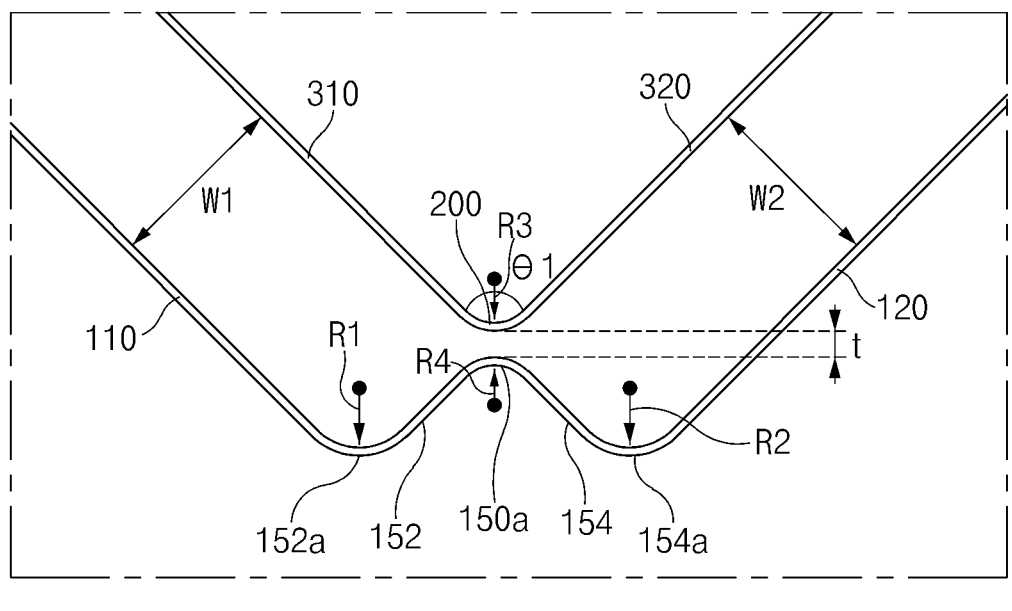
FIG. 4 is an enlarged view illustrating a bent part, a connection part, and a periphery of the bent part and the connection part.
Figure 5:
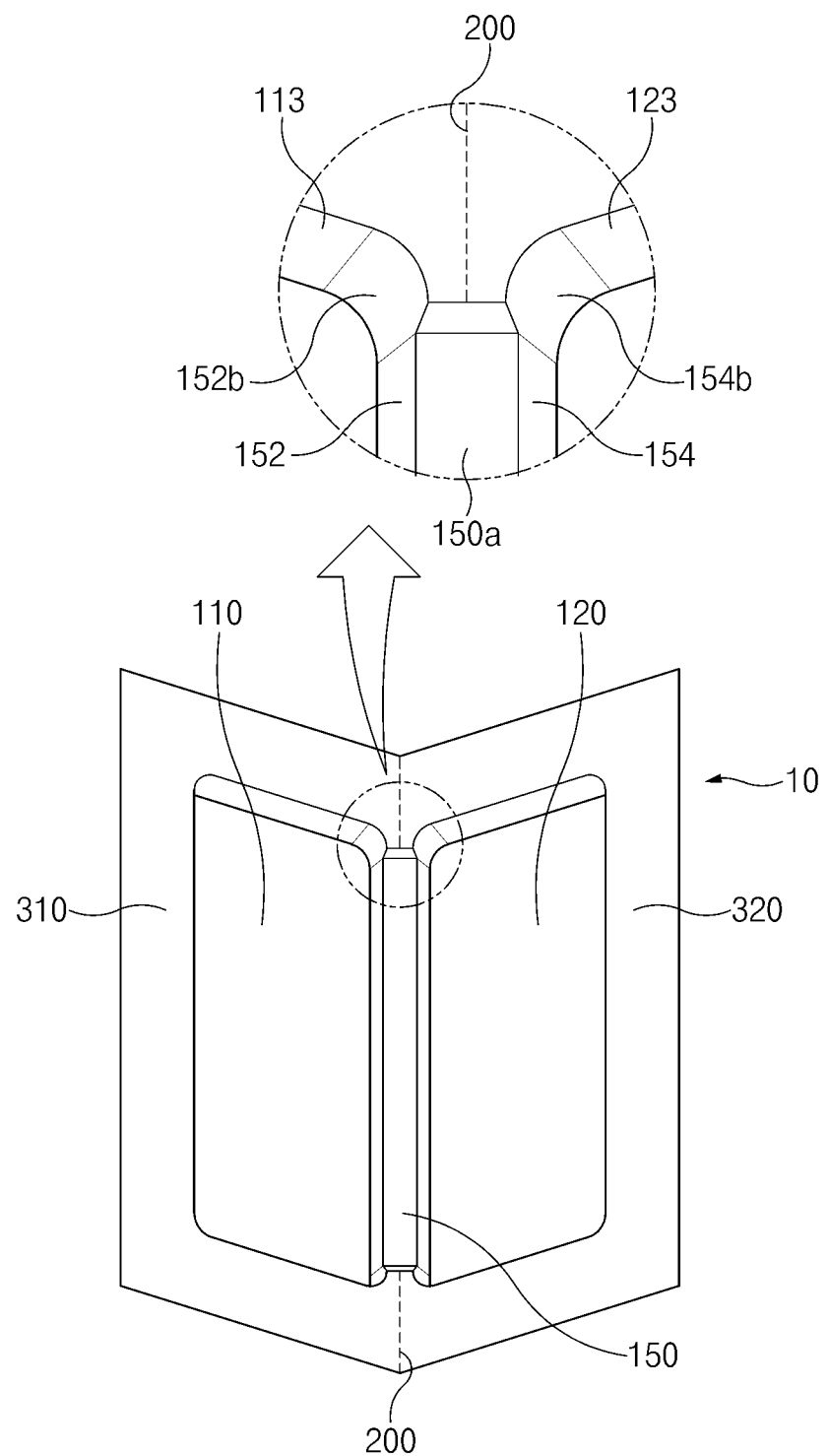
FIG. 5 is a view illustrating a state in which the case for the secondary battery is unfolded according to an embodiment of the present invention.

FIG. 4 is an enlarged view illustrating a bent part, a connection part, and a periphery of the bent part and the connection part, and FIG. 5 is a view illustrating a state in which the case for the secondary battery is unfolded according to an embodiment of the present invention.

Each of the first recess part 110 and the second recess part 120 may be recessed by a predetermined depth from each of the first and second circumferential parts 310 and 320. FIG. 4 illustrates a state in which the first recess part 110 is recessed by a predetermined depth W1 from the first circumferential part 310, and the second recess part 120 is recessed by a predetermined depth W2 from the second circumferential part 320.

When the case 10 is unfolded, the first recess part 110 and the second recess part 120 have shapes that are symmetrical to each other with respect to the connection part 150. Thus, referring to FIG. 4, the depth W1 by which the first recess part 110 is recessed from the first circumferential part 310 may be the same as the depth W2 by which the second recess part 120 is recessed from the second circumferential part 320. However, unlike this, the first recess part 110 and the second recess part 120 may have shapes that are asymmetrical to each other. Thus, according to another embodiment of the present invention, the depth W1 by which the first recess part 110 is recessed from the first circumferential part 310 may be different from the depth W2 by which the second recess part 120 is recessed from the second circumferential part 320.

Also, as described above, the connection part 150 may include a first connection surface 152 formed to be inclined upward from one end of the first recess part 110 and a second connection surface 154 formed to be inclined upward from one end of the second recess part 120. Referring again to FIG. 3, when the case 10 is unfolded, the case 10 according to the present invention may have a V shape on an area on which the first circumferential part 310 and the second circumferential part 320 meet each other. Thus, a bent part 200 may be provided on an area on which the first circumferential part 310 and the second circumferential part 320 meet each other, and the bent part 200 may have a predetermined angle θ1. The angle θ1 may have a value between about 80 degrees to about 160 degrees. In more detail, the angle θ1 may be 80 degrees or more or 160 degrees or less.

Also, as illustrated in FIG. 3, the one surface 112, which is formed at an opposite side of the connection part 150 on the circumferential surfaces 112 and 113 of the first recess part 110, and the first circumferential part 310 may meet each other at a predetermined angle α. Here, the angle α may be an obtuse angle. Similarly, the predetermined angle may be an obtuse angle at an area on which the one surface 122, which is formed at an opposite side of the connection part 150 on the circumferential surfaces 122 and 123 of the second recess part 120, and the second circumferential part 320 meet each other.

A portion of the recess space A1 formed by the first recess part 110, which is adjacent to the one surface 112 of the first recess part 110, and a portion of the recess space A2 formed by the second recess part 120, which is adjacent to the one surface 122 of the second recess part 120, may form a void space V1 that is not occupied by an electrode assembly 20 (see FIG. 8) when the case 10 is sealed.

During a process of forming the case 10, an angle θ1 of the bent part 200 may increase, and a clearance between an upper punch (not shown) and a lower die (not shown) may decrease to reduce the void space V1. However, if the angle θ1 of the bent part 200 is too large, a bat-ear may occur when the case 10 is sealed, or excessive creases may occur around the bent part 200. As a result, it is important to properly design the angle θ1 of the bent part 200.

When the case 10 is unfolded, an area 152a on which the first recess part 110 and the connection part 150 are connected to each other and an area 154a on which the second recess part 120 and the connection part 150 are connected to each other may be formed as a curved surface. That is, as illustrated in FIG. 4, the area 152a on which the bottom surface 111 of the first recess part 110 and the first connection surface 152 are connected to each other may be formed as a curved surface having a predetermined radius of curvature R1. Similarly, an area on which the bottom surface 121 of the second recess part 120 and the second connection surface 154 are connected to each other may be formed as a curved surface having a predetermined radius of curvature R2.

Also, when the case 10 is unfolded, an area (i.e., the bent part 200) on which the first circumferential part 310 and the second circumferential part 320 are connected to each other may be formed as a curved surface. FIG. 4 illustrates a state in which an area 200, on which the first circumferential part 310 and the second circumferential part 320 are connected to each other, is formed as a curved surface having a predetermined radius of curvature R3.

Also, when the case 10 is unfolded, the area 150a on which the first connection surface 152 and the second connection surface 154 are connected to each other may also be formed as a curved surface. FIG. 4 illustrates a state in which an area 150a, on which the first connection surface 152 and the second connection surface 154 are connected to each other, is formed as a curved surface having a predetermined radius of curvature R4.

For convenience, each of the areas on which the bottom surfaces 111 and 121 of the recess parts 110 and 120 and the connection surfaces 152 and 154 are connected to each other, respectively, may be referred to as a first area, the area on which the first circumferential part 310 and the second circumferential part 320 are connected to each other may be referred to as a second area, and the area on which the first connection surface 152 and the second connection surface 154 are connected to each other may be referred to as a third area.

Each of the first areas 152a and 154a and the second area 200 may be a curved surface that are convexly curved downward, and the third area 150a may be a curved surface that is convexly curved upward.

The second area 200 and the third area 150a may have a predetermined height difference t with respect to a vertical direction. The height difference t may be referred to as a foaming depth.

In order to reduce the occurrence of the bat-ear when the case 10 is sealed, the height difference t may vary according to the angle θ1 of the bent part 200. However, if the height difference t increases excessively, creases may occur around the second area 200 and/or the third area 150a when the case 10 is sealed. Thus, it is important to properly design the angle θ1 of the bent portion 200 and the height difference t.

Here, according to the present invention, when the case 10 is unfolded, each of the curvature radii R1 and R2 of the first areas 152a and 154a may be greater than the curvature radius R3 of the second area 200 and the curvature radius R4 of the third area 150a.

Each of areas 152b and 154b on which each of the circumferential surfaces of the recess parts 110 and 120 and the connection part 150 are connected to each other may be formed as a curved surface having a predetermined curvature radius (for example, about 2 mm).

In more detail, the area 152b on which the side surface 113 of the first recess part 110 and the first connection surface 152 are connected to each other may be formed as a curved surface having a predetermined curvature radius. Also, the area 154b on which the side surface 123 of the second recess 120 and the second connection surface 154 are connected to each other may be formed as a curved surface having a predetermined curvature radius. Thus, it is possible to alleviate the occurrence of the creases around the connection portion 150 when the case 10 is sealed.

Figure 6:
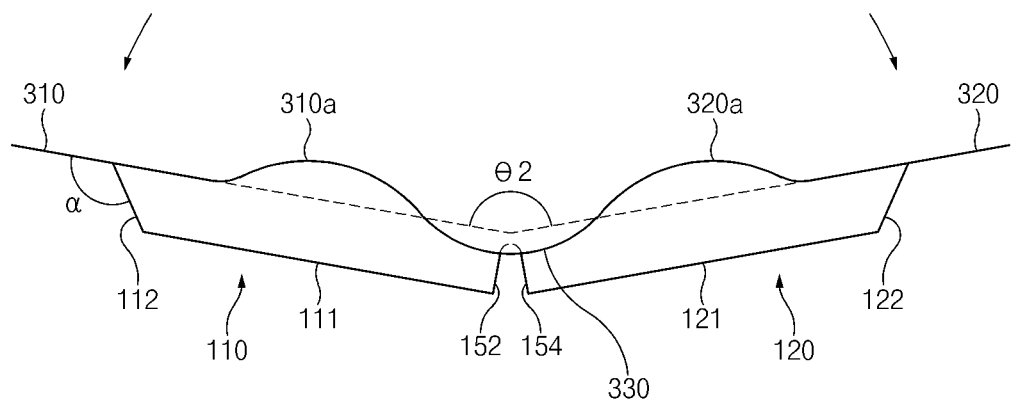
FIG. 6 is a vertical cross-sectional view illustrating a state in which the case for the secondary battery is unfolded by external force according to an embodiment of the present invention.
Figure 7:
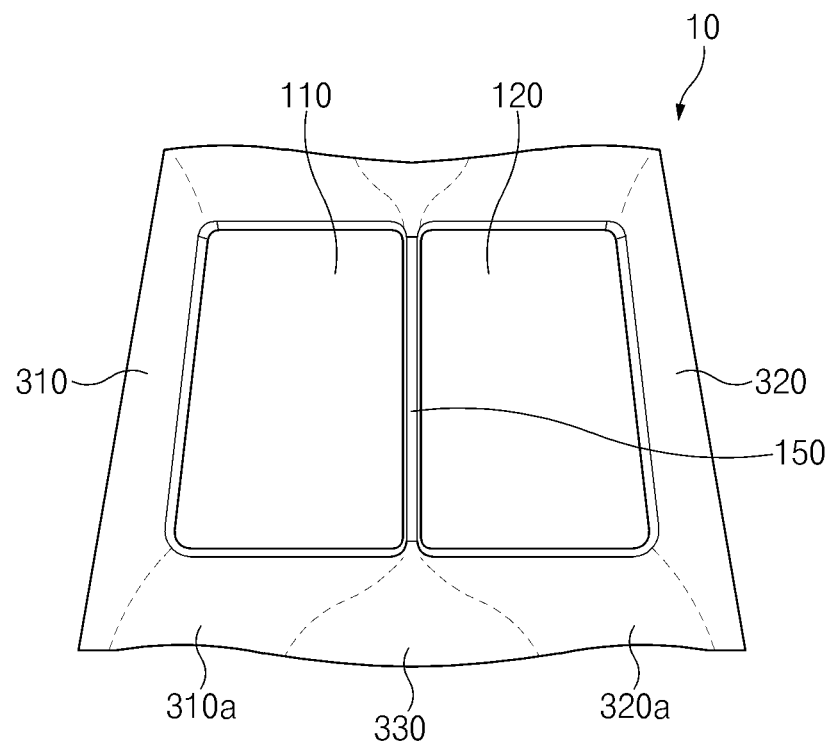
FIG. 7 is a view illustrating a state in which the case for the secondary battery is unfolded by the external force according to an embodiment of the present invention.

FIG. 6 is a vertical cross-sectional view illustrating a state in which the case for the secondary battery is unfolded by external force according to an embodiment of the present invention, and FIG. 7 is view illustrating a state in which the state in which the case for the secondary battery is unfolded by the external force according to an embodiment of the present invention.

The state in which the case 10 is unfolded by external force may mean a state in which the external force acts in a direction in which the first and second circumferential parts 310 and 320 are unfolded in the state in which the case 10 is unfolded.

In more detail, in the state in which the case 10 is unfolded by the external force, an angle θ2 between a portion of the first circumferential part 310, which is disposed at an opposite side of the connection part 150, and a portion of the second circumferential part 320, which is disposed at an opposite side of the connection part 150, may be greater than the angle θ1 (see FIG. 3) of the cutoff part 200 in the state in which the case 10 is unfolded.

When the case 10 is unfolded by the external force, a deformed part 330 having a curved shape that is convex downward may be formed on the circumferential part 300.

The deformed part 330 may have a curved shape that is bent to be biased downward.

The deformed part 330 may be connected to an end of the connection part 150 with respect to a longitudinal direction of the connection part 150. That is, the deformed part 330 may be provided in a pair, which are connected to both ends of the connection part 150.

Each of the deformed parts 330 may be formed over an area from the end of the connection part 150 to an edge of the circumferential part 300. Each of the deformed parts 330 may be formed to have a height that gradually decreases from the connection part 150 toward the edge of the circumferential part 300. Also, a width of each of the deformed parts 300 may gradually increase toward the edge of the circumferential part 300.

A portion of the deformed part 330 may be disposed on the first circumferential part 310, and the other portion may be disposed on the second circumferential part 320. Thus, each of the deformed parts 330 may include an area on which the first circumferential part 310 and the second circumferential part 320 meet each other.

In addition, the deformed part 330 may have the lowest height at the area on which the first circumferential part 310 and the second circumferential part 320 meet each other, and the height may gradually increase toward sub-deformed parts 310a and 320a. That is, each of the deformed parts 330 may have the lowest height at a central portion and may have a height that gradually increases toward both sides.

As described above, when the external force acts to unfold the first and second circumferential parts 310 and 320 in the state in which the case 10 is unfolded, the deformed part 330 may be formed. Therefore, if the external force acts so that the first circumferential part 310 and the second circumferential part 320 approach each other in the state in which the case 10 is unfolded, the area of the circumferential part 300, which corresponds to the deformed part 330, may be concavely bent in a direction that is opposite to the deformed part 330.

Thus, when the case 10 is sealed, a phenomenon in which the area of the circumferential part 300, which corresponds to the deformed part 330, protrudes outward from the recess part 100 may be minimized or prevented. That is, the bat-ear may be eliminated or minimized.

When the case 10 is unfolded by the external force, sub-deformed parts 310a and 320a, each of which has a curved shape that is convex upward, may be further formed on the circumferential part 300.

Each of the sub-deformed parts 310a and 320a may have a curved shape that is bent to be biased upward.

The sub-deformed parts 310a and 320a may include a first sub-deformed part 310a and a second sub-deformed part 320a, which are disposed at both sides of the deformed part 330. The first sub-deformed part 310a may be disposed at one side of the deformed part 330 and may be disposed on the first circumferential part 310. The second sub-deformed part 320a may be disposed at the other side of the deformed part 330 and may be disposed on the second circumferential part 320.

The first sub-deformed part 310a may be formed over an area from the edge of the first recess part 110 to the edge of the circumferential part 300, and the second sub-deformed part 320a may be formed over an area from the edge of the second recess part 120 to the edge of the circumferential part 300.

Each of the first sub-deformed part 310a and the second sub-deformed part 320a may have a height that gradually decreases toward each of both sides, unlike the deformed part 330.

Therefore, if the external force acts so that the first circumferential part 310 and the second circumferential part 320 approach each other in the state in which the case 10 is unfolded, the area of the circumferential part 300, which corresponds to the deformed part 330, may be further concavely bent in the direction that is opposite to the deformed part 330, and thus, the bat-ear may be more reduced or eliminated.

Figure 8:
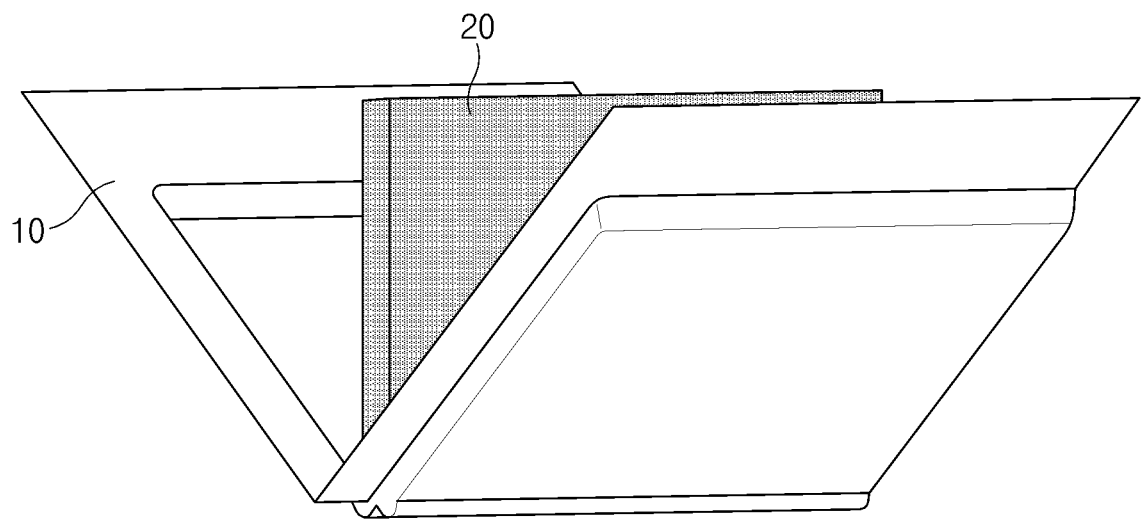
FIG. 8 is a perspective view illustrating a state in which an electrode assembly is accommodated in the case for the secondary battery according to the present invention.

FIG. 8 is a perspective view illustrating a state in which an electrode assembly is accommodated in the case for the secondary battery according to the present invention.

As illustrated in FIG. 8, a secondary battery according to the present invention may include the electrode assembly 20 having a structure, in which electrodes and separators are alternately disposed, and the case 10. Contents with respect to the case 10 are substituted with the above-described contents.

As illustrated in FIG. 8, the secondary battery according to the present invention may be manufactured through the following processes: (i) the electrode assembly 20 is accommodated in a first recess part 110 (see FIG. 3) and a second recess part 120 (see FIG. 3) in a state in which the case 10 is unfolded, (ii) an area, on which the first recess part and a first circumferential part are formed, and an area, on which the second recess part and a second circumferential part are formed, are folded, and (iii) the first circumferential part and the second circumferential part are attached to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Case
20 : Electrode assembly
100: Recess part
110: First recess part
120: Second recess part
150: Connection part
152: First connection surface
154: Second connection surface
200: Bent part
300: Circumferential part
310: First circumferential part
320: Second circumferential part
330: Deformed part
A1: Recessed space defined by first recess part
A2: Recessed space defined by second recess part
W1: Recessed depth of first recess part
W2: Recessed depth of second recess part
R1: Curvature radius of connection area between first recess part and first connection surface
R2: Curvature radius of connection area between second recess part and second connection surface
R3: Curvature radius of connection area between first circumferential part and second circumferential part
R4: Curvature radius of connection area between first connection surface and second connection surface

The invention claimed is:

1. A case for a secondary battery comprising:
a first recess part having a first recessed shape;
a second recess part opposite the first recess part and having a second recessed shape; and
a connection part provided between the first recess part and the second recess part to connect the first recess part to the second recess part,
wherein, when the case is in an unfolded state, the connection part comprises:
a first connection surface inclined in a first direction from one end of the first recess part; and
a second connection surface inclined in the first direction from one end of the second recess part,
wherein, when the case is in the unfolded state, the case is bent in a V shape on an area on which a first circumferential part and a second circumferential part meet each other and the case is inhibited from opening beyond the V shape by the area without an external force so that a first recessed space defined by the first recess part and a second recessed space defined by the second recess part face each other.

2. The case of claim 1, wherein an upper end of the first connection surface and an upper end of the second connection surface are connected to each other at an upper end of the connection part.

3. The case of claim 1, wherein, when the case is unfolded, the first recess part and the second recess part have shapes that are symmetrical to each other with respect to the connection part.

4. The case of claim 1, wherein a circumferential part comprises: the first circumferential part disposed on a circumference of the first recess part; and the second circumferential part disposed on a circumference of the second recess part.

5. The case of claim 4, wherein, when the case is unfolded, the case is bent in a V shape on the area on which the first circumferential part and the second circumferential part meet each other so that a first recessed space defined by the first recess part and a second recessed space defined by the second recess part face each other.

6. The case of claim 4, wherein an angle between the first circumferential part and the second circumferential part has a value between about 80 degrees and about 160 degrees when the case is at rest in the unfolded state.

7. The case of claim 1, wherein, when the case is unfolded, the first connection surface extends from a bottom surface of the first recess part and is inclined in the first direction, and the second connection surface extends from a bottom surface of the second recess part and is inclined in the first direction.

8. The case of claim 1, wherein, when the case is unfolded, each of an area on which the first recess part and the connection part are connected to each other and an area on which the second recess part and the connection part are connected to each other is formed as a curved surface.

9. The case of claim 1, wherein, when the case is unfolded, an area on which the first connection surface and the second connection surface are connected to each other is formed as a curved surface.

10. The case of claim 4, wherein, when the case is unfolded, each of an area on which the first recess part and the first connection surface are connected to each other is formed as the first curved surface and an area on which the second recess part and the second connection surface are connected to each other is formed as the second curved surface, an area on which the first connection surface and the second connection surface are connected to each other is formed as a third curved surface, and each of a first radius of curvature of a first curved area on which the first recess part and the first connection surface are connected to each other and a second radius of curvature of a second curved area on which the second recess part and the second connection surface are connected to each other is greater than each of a third radius of curvature of a third curved area on which the first circumferential part and the second circumferential part are connected to each other and a fourth radius of curvature of a fourth curved area on which the first connection surface and the second connection surface are connected to each other.

11. The case of claim 4, wherein an angle ($\alpha$) defined by an inner surface formed at an opposite side of the connection part among inner surfaces of the first recess part and the first circumferential part, which meet each other, is an obtuse angle.

12. A secondary battery system comprising:

an electrode assembly having a structure in which electrodes and separators are alternately disposed; and the case for the secondary battery of claim 1.

13. The case of claim 1, wherein, when the external force acts in a direction in which the circumferential parts is unfolded in a state in which the case is unfolded, a circumferential part is provided with a deformed part having a curved shape that is convex in a second direction and having a height that gradually decreases from the connection part toward an edge of the circumferential part.

14. The case of claim 13, wherein the deformed part has a width that gradually increases toward the edge of the circumferential part.

15. The case of claim 13, wherein the circumferential part comprises: the first circumferential part formed on a circumference of the first recess part; and the second circumferential part formed on a circumference of the second recess part, wherein the deformed part comprises an area on which the first circumferential part and the second circumferential part meet each other.

16. The case of claim 15, wherein, when the external force acts in a direction in which the pair of circumferential parts are unfolded in the state in which the case is unfolded, the circumferential part further includes:

a first sub-deformed part that is disposed at a first side of the deformed part, is convex in the first direction, and is disposed on the first circumferential part; and a second sub-deformed part that is disposed at a second side of the deformed part opposite the first side, is convex in the first direction, and is disposed on the second circumferential part.

17. The case of claim 1, wherein each of an area on which a circumferential surface of the first recess part and the first connection surface are connected to each other and an area on which a circumferential surface of the second recess part and the second connection surface are connected to each other is formed as a curved surface.

* * * * *